UNITED STATES PATENT OFFICE.

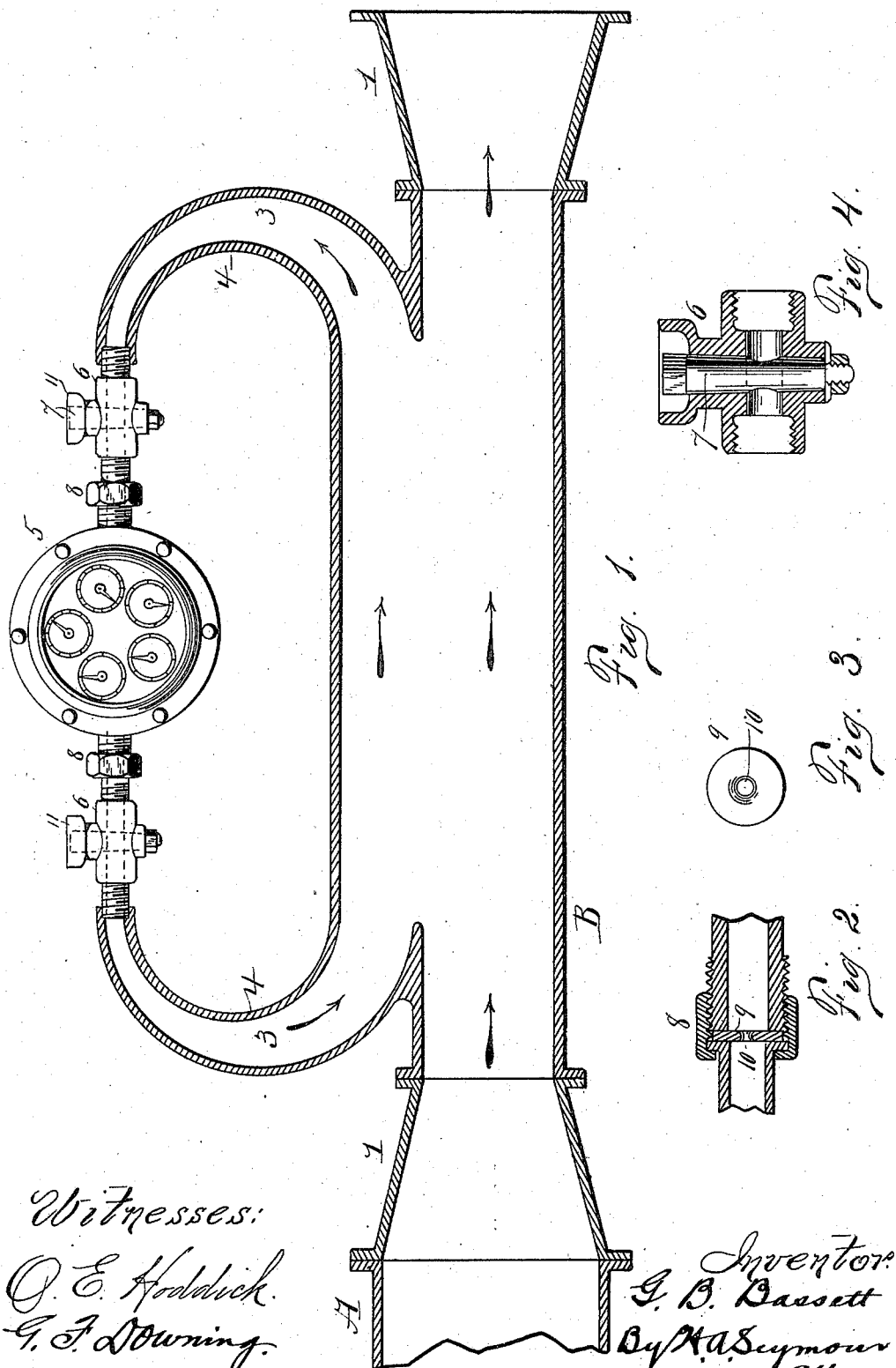

GEORGE B. BASSETT, OF BUFFALO, NEW YORK.

WATER-METER.

SPECIFICATION forming part of Letters Patent No. 576,249, dated February 2, 1897.

Application filed June 15, 1896. Serial No. 595,655. (No model.)

*To all whom it may concern:*

Be it known that I, GEORGE B. BASSETT, of Buffalo, in the county of Erie and State of New York, have invented certain new and useful Improvements in Water-Meters; and I do hereby declare the following to be a full, clear, and exact description of the invention, such as will enable others skilled in the art to which it appertains to make and use the same.

My invention relates to an improvement in means for measuring flowing water; and it consists in the combination, with a water-main, of an auxiliary passage so arranged with respect to the main that water will be made to flow continuously through it by attrition of the water flowing through the main in a direction opposite the direction of flow in the main, and a meter located in said auxiliary passage.

The invention further consists in certain novel features of construction and combinations and arrangements of parts, as hereinafter set forth, and pointed out in the claims.

In the accompanying drawings, Figure 1 is a longitudinal sectional view embodying my improvements. Figs. 2, 3, and 4 are detail views.

A represents the water-main, and B an interposed section or passage which communicates with the main A and in effect forms a part of the latter, the section or passage B being made of smaller diameter than the main A and connected therewith by means of reducing-couplings 1, so that the speed of the water in the main will be accelerated during its passsge through the section or passage B.

The section B is enlarged centrally at one side, and extending outwardly from the ends of said enlargement are curved passages 3 3, formed in hollow curved arms or pipes 4.

Located between the ends of the curved arms 4 is a meter 5, coupled up to the arms by suitable couplings, each coupling carrying a valve, the whole forming a continuous passage-way through which a continuous circulation of water will be maintained by the attrition of the water flowing through the main. The curved arms or pipes 4 are preferably made tapering, and with their free ends valve-casings 6 are connected and provided with valves 7, and the inner ends of said valve-casings are connected by means of couplings 8 with the meter 5, which latter may be made of any preferred form of construction. Each valve-casing is made with a cup 11 for the reception of the stem of the valve. This cup may be filled with wax or other suitable material, whereby to prevent the danger of any unauthorized persons tampering with the device. Within one of the couplings 8 a washer 9, having a hole 10 therein, is placed, and by means of this washer the flow of water passing through the meter may be regulated.

The washer 9 may be replaced by one having a larger or smaller orifice, as it may be desirable to vary the force of the water passing through the meter according to the conditions under which it is applied. The force of the water through the meter can also be regulated by means of the valve 7.

The devices which control the flow of water through the meter will be so adjusted with respect to the capacity of the main that an amount of water will pass through the meter in a given length of time indicative of a predetermined amount of water flowing through the main in the same length of time.

It has been found by careful study and experiment that a more exact calculation can be made in adjusting devices with rapidly-flowing water than with water passing slowly through the main. For this reason the section B of the main is contracted in size, as above explained. The portions 3 3 of the auxiliary passage being made small, the speed of the water through the meter will be accelerated, and the speed of the water will be further increased more or less in adjusting the apparatus by means of the valve 7 and changing the washer 9.

It is apparent that the water in the auxiliary passage will be kept in constant circulation by attrition of the water passing through the main, the speed of the water in said auxiliary passage increasing or diminishing in proportion to the speed of the water in the main.

My improvements are simple in construction and effectual in all respects in the performance of their functions.

Having fully described my invention, what I claim as new, and desire to secure by Letters Patent, is—

1. The combination with a water-main, of an auxiliary passage so arranged with respect to the main that water will be made to flow continuously through it in the opposite direction from that of the water in the main by attrition of the water flowing through the main, and a meter in said auxiliary passage, substantially as set forth.

2. A measuring apparatus for flowing water consisting of a main passage, an auxiliary passage communicating with the main passage, said passages being so arranged with respect to each other that water passing through the main passage will cause a continuous circulation of water in the auxiliary passage by attrition in the opposite direction from that of the water in the main and a meter in said auxiliary passage, substantially as set forth.

3. In a measuring apparatus for flowing water, the combination with a main passage adapted to communicate with a water-main, of an auxiliary passage communicating with said main passage and through which water is forced in the opposite direction from that in the main and having an extended communication therewith, and a meter in said auxiliary passage, substantially as set forth.

4. The combination with a water-main, of an auxiliary passage having an extended communication with the water-main and through which water is forced in the opposite direction from that in the main, and a meter in said auxiliary passage, substantially as set forth.

5. The combination with a water-main, of an auxiliary passage so arranged with respect to the main that water passing through the main will cause a continuous circulation of water in the auxiliary passage by attrition, and a meter in said auxiliary passage, said auxiliary passage being smaller where it communicates with the meter than where it receives water from the main, substantially as set forth.

6. The combination with a water-main, of an auxiliary passage having an extended communication with the water-main, the respective ends of said auxiliary passage being curved in reverse directions and toward each other, and a meter attached between said curved ends and forming part of the auxiliary passage, substantially as set forth.

7. The combination with a water-main, of an auxiliary passage having an extended communication with the water-main, the respective ends of said auxiliary passage being curved and made tapering, and a meter between the smaller ends of said curved tapering parts of the auxiliary passage, substantially as set forth.

8. The combination with a water-main, of an auxiliary passage having an extended communication with the main longitudinally thereof and through which water is forced in an opposite direction from that in the main, said auxiliary passage having curved ends, a meter disposed between said curved ends of the auxiliary passage, and devices in said auxiliary passage for regulating the flow of water through said auxiliary passage, substantially as set forth.

9. The combination with a water-main, of an auxiliary passage having an extended communication with the main, longitudinally thereof, and through which the water is forced in an opposite direction from that in the main said auxiliary passage having curved ends, a meter between said curved ends, valves between said meter and the curved ends of the auxiliary passage, the casings of said valves having cups in which the stems of said valves terminate, substantially as set forth.

In testimony whereof I have signed this specification in the presence of two subscribing witnesses.

GEORGE B. BASSETT.

Witnesses:
JOS. H. BLACKWOOD,
R. S. FERGUSON.